US006493470B1

(12) United States Patent
Ikeda et al.

(10) Patent No.: US 6,493,470 B1
(45) Date of Patent: *Dec. 10, 2002

(54) IMAGE PROCESSING METHOD AND APPARATUS FOR DETECTING THE TILT AMOUNT OF INPUT IMAGE DATA

(75) Inventors: Hiroaki Ikeda, Yokohama (JP); Toru Niki, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/665,952

(22) Filed: Jun. 19, 1996

(30) Foreign Application Priority Data

Jun. 20, 1995  (JP) ............................................. 7-153312

(51) Int. Cl.[7] .................................................. G06K 9/36
(52) U.S. Cl. ....................... 382/289; 382/173; 382/181; 382/291
(58) Field of Search ................................. 382/170, 175, 382/176, 181, 177, 178, 289, 290, 291, 173

(56) References Cited

U.S. PATENT DOCUMENTS

| 3,898,617 A | * | 8/1975 | Kashioka et al. ............. 382/151 |
| 4,251,799 A | * | 2/1981 | Jih ........................... 340/146.3 |
| 4,334,241 A | * | 6/1982 | Kashioka et al. ............. 358/105 |
| 4,533,959 A | * | 8/1985 | Sakurai ......................... 382/61 |
| 4,635,293 A | * | 1/1987 | Watanabe ..................... 382/130 |
| 4,876,730 A | * | 10/1989 | Britt .............................. 382/219 |
| 4,878,124 A | * | 10/1989 | Tsujimoto et al. ............. 358/280 |
| 4,926,490 A | * | 5/1990 | Mano ............................ 382/177 |
| 4,985,930 A | * | 1/1991 | Takeda et al. .................. 382/56 |
| 5,001,766 A | * | 3/1991 | Baird ............................ 382/46 |
| 5,101,448 A | * | 3/1992 | Kawachiya et al. .......... 382/287 |
| 5,140,647 A | | 8/1992 | Ise et al. ....................... 382/41 |
| 5,140,650 A | * | 8/1992 | Casey et al. .................. 382/283 |
| 5,181,257 A | * | 1/1993 | Steiner et al. ................. 382/162 |
| 5,220,621 A | * | 6/1993 | Saitoh ............................ 382/22 |
| 5,228,095 A | * | 7/1993 | Abe ................................ 382/9 |
| 5,452,374 A | | 9/1995 | Cullen et al. ................. 382/293 |
| 5,475,766 A | * | 12/1995 | Tsuchiya et al. ............. 382/144 |
| 5,506,918 A | * | 4/1996 | Ishitani ......................... 382/46 |
| 5,539,532 A | * | 7/1996 | Watanabe ..................... 358/443 |
| 5,594,815 A | * | 1/1997 | Fast et al. .................... 382/254 |
| 5,619,589 A | * | 4/1997 | Ostu et al. ................... 382/155 |
| 5,872,871 A | * | 2/1999 | Yokoyama et al. .......... 382/144 |
| 6,043,823 A | * | 3/2000 | Kodaira et al. .............. 345/433 |

FOREIGN PATENT DOCUMENTS

| DE | 4311172 | 4/1993 | .......... G06K/15/68 |
| EP | 0287027 | 10/1988 | ............ G06K/9/32 |

* cited by examiner

Primary Examiner—Leo Boudreau
Assistant Examiner—Sheila Chawan
(74) Attorney, Agent, or Firm—Fitzpatrick, Cella, Harper & Scinto

(57) ABSTRACT

An image processor which corrects tilt of an input image without operator intervention. Projections of two partial images of an original are obtained at check points determined from input image information. A tilt angle of the original is obtained from a correction position of the projections of each partial area. The image is divided into belt-shaped small areas and shifted in accordance with the obtained tilt angle to form an image in which the tilt of the input image is corrected.

29 Claims, 7 Drawing Sheets

1/ tan θ

IMAGE PROCESSING METHOD AND APPARATUS FOR DETECTING THE TILT AMOUNT OF INPUT IMAGE DATA

BACKGROUND OF THE INVENTION

1. Field of the Invention

The invention relates to image processing method and apparatus for automatically correcting tilt of an inputted document image or the like.

The invention also relates to an image processing method and apparatus for editing an input image to an image suitable for extracting characters.

2. Related Background Art

Hitherto, when an input image in an image processing apparatus is rotated, a rotational angle is designated and the image is rotated by only the designated angle. Or, a straight line is drawn on a displayed image by using a mouse or the like and the image is rotated by only an angle such that the straight line is horizontal or vertical. In any one of the above methods, the rotational angle is inputted by the user.

In order to make the above processes unnecessary or to process an image by an apparatus without such a function, when the image is inputted, at a point in time when an original is set on a scanner, careful attention has to be paid so as not to bend a document of the original.

In the above conventional apparatus, however, when most of the portion of the input image is a document, it is desirable that a line is horizontal or vertical. In order to correct tilt, the operation by the user to instruct a rotational amount is always necessary. This is a drawback such that it becomes a burden for the operator.

SUMMARY OF THE INVENTION

According to the invention, an image processing method and apparatus which can eliminate tilt of an image at a high speed by shifting a strip of a width obtained from a tilt amount can be provided.

According to the invention, at least two partial image areas are determined in input image information and a tilt amount of the inputted image information is detected in accordance with projections which are detected from the two decided partial image areas, so that tilt of the input original can be accurately detected without intervention by the user.

According to the invention, by correcting tilt of the inputted image information in accordance with the detected tilt amount, image information whose tilt has been corrected can be obtained in accordance with tilt of the input image without intervention by the user.

According to the invention, by deciding the two partial image areas at a plurality of positions of the image information, a tilt amount can be more accurately detected.

According to the invention, by repeating the process to detect the tilt amounts at the decided plurality of positions, a tilt amount can be more accurately detected.

According to the invention, by detecting the tilt amount on the basis of a correlation of the projections which are detected from the two partial image areas, since the tilt amount is detected by the existing position of a line, so that a tilt amount can be more accurately detected.

According to the invention, one of the partial image areas is fixed, a correlation of the projections are detected while shifting he other partial image area, and a tilt angle is detected on the basis of the position of the partial image area in which the correlation is maximum, so that the tilt amount can be accurately detected.

According to the invention, by setting a shift of the partial image area into a predetermined range, the tilt amount can be efficiently detected.

According to the invention, when it is judged that an amount of a projection which is obtained from the partial image is insufficient, by interrupting a process to obtain a tilt amount, an unnecessary process at a location which is unsuitable for detection of the tilt amount can be interrupted, so that the processes can be efficiently executed.

According to the invention, the maximum value and the minimum value of the correlation among the projections are obtained and when a difference between the maximum and minimum values is small, by interrupting a process to obtain a tilt amount, an unnecessary process at a location which is unsuitable for detection of the tilt amount can be interrupted, so that the processes can be efficiently executed.

According to the invention, by displaying the corrected image information on a display means, an image of a high quality in which the tilt was corrected can be confirmed on the display.

According to the invention, by printing the corrected image information by printing means, a recording medium on which an image of a high quality in which the tilt had been corrected was printed can be obtained.

According to the invention, by registering the corrected image information into an electronic file, an image of a high quality can be registered into the electronic file having an object to preserve the images.

According to the invention, by recognizing the corrected image information, an image of a high quality can be provided for a recognizing process which needs an image of a high quality in order to obtain a high recognition ratio.

According to the invention, as for the correction of the image mentioned above, a division width of the image is determined in accordance with the detected tilt amount, the image is divided into a plurality of small areas of the decided division width, and the image is corrected by forming images obtained by shifting each of the plurality of divided small areas, so that a correcting process of the image that is suitable for the tilt of the image can be executed.

According to the invention, as for the division to the small areas of the image, the image is divided into each of the horizontal and vertical directions, and as for the formation of the images, a shifting process is executed to the divided small areas in both of the horizontal and vertical directions, so that the image whose tilt was corrected at a higher quality can be formed.

DETAILED DESCRIPTION OF THE PREFERRED EMBODIMENTS

Figure 1:
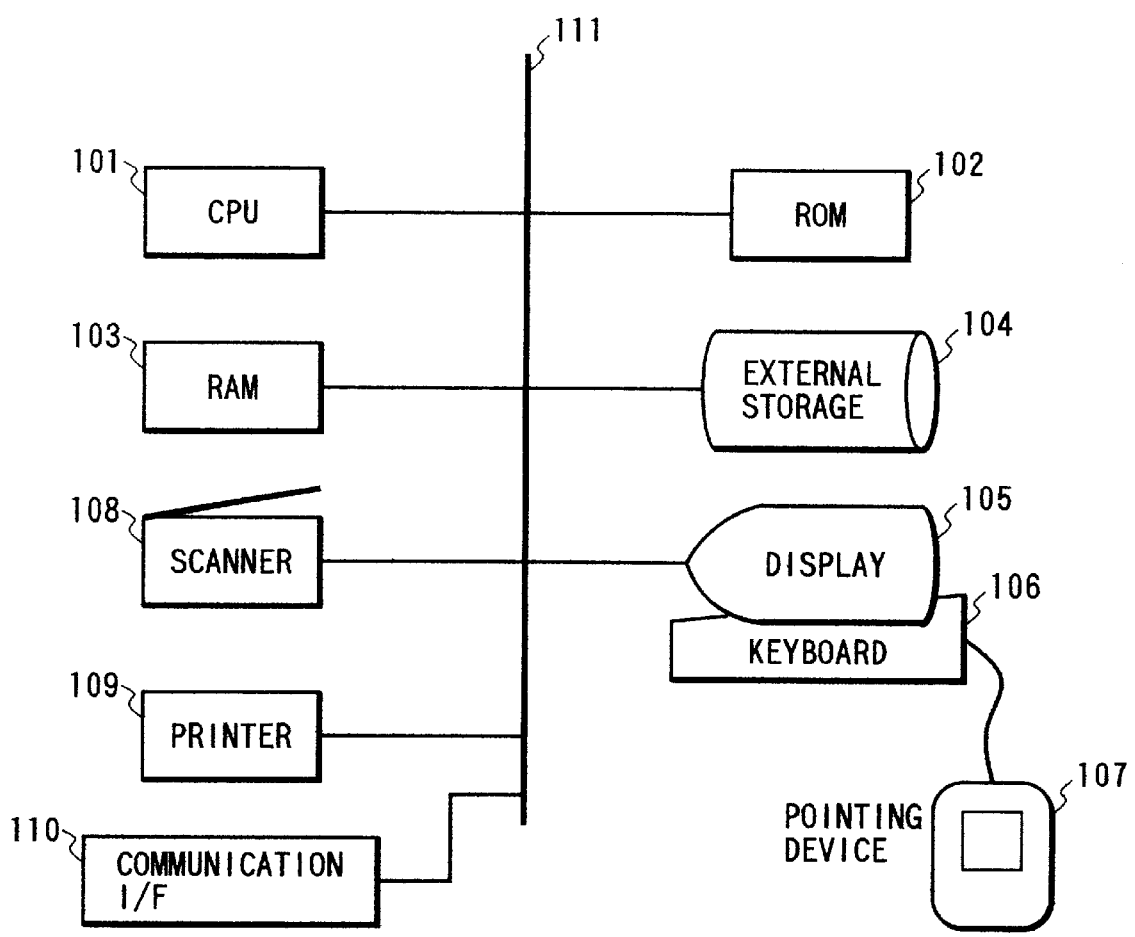
FIG. 1 is a block diagram of an image processing apparatus according to the first embodiment.

FIG. 1 is a block diagram showing a construction of an image processing apparatus which embodies the invention. Reference numeral 101 denotes a CPU for controlling the entire apparatus in accordance with a control program stored in an ROM 102 in accordance with flowcharts, which will be explained hereinlater; 103 an RAM to store a document image or the like; 104 an external storage such as a magnetic disk or the like; 105 a display; 106 a keyboard; 107 a pointing device such as a mouse or the like; and 108 an image scanner to read an image.

Figure 2:
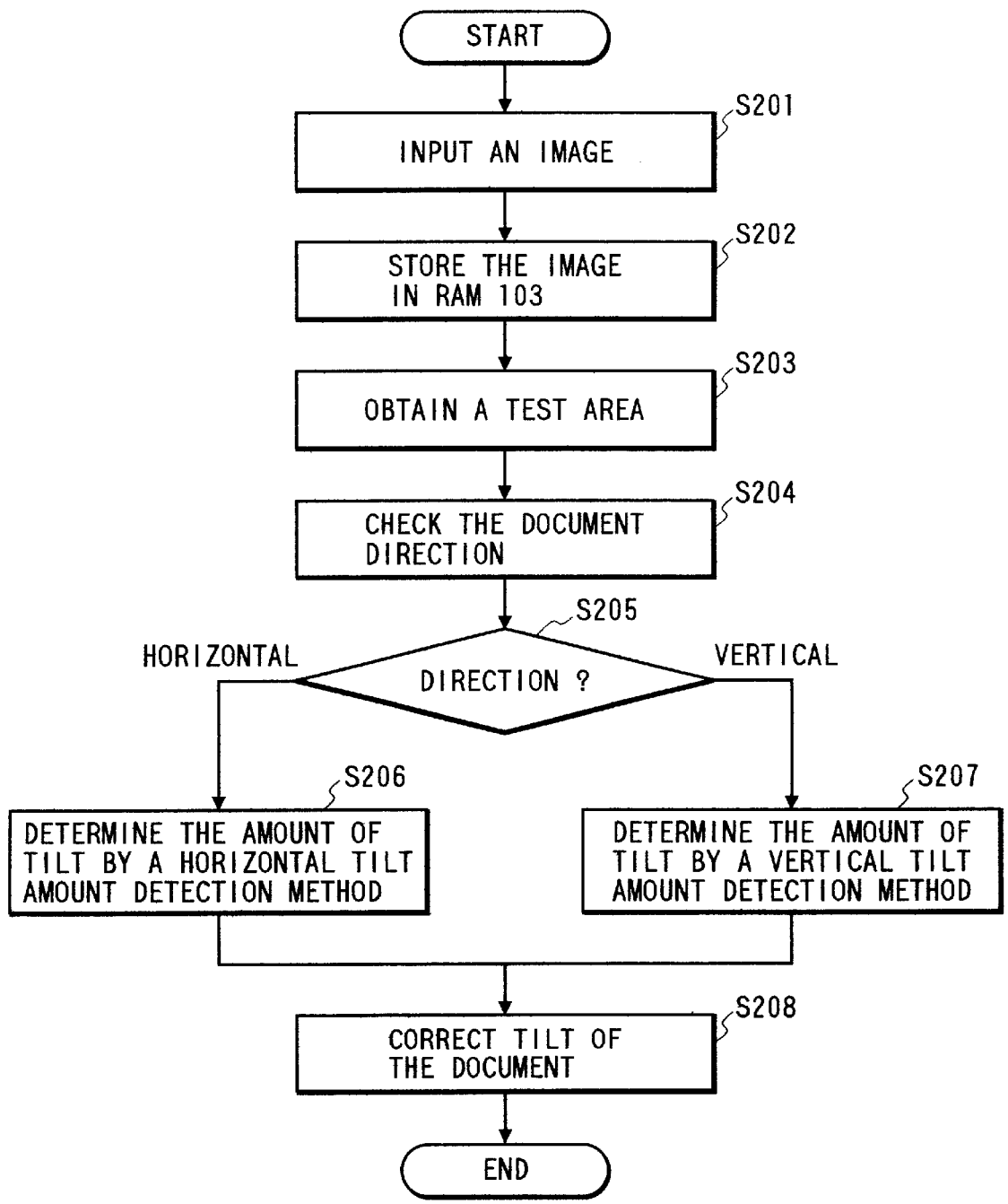
FIG. 2 is a flowchart for processes which are executed by the image processing apparatus according to the first embodiment.

Processes in the embodiment which are executed by the image processing apparatus with the construction shown in FIG. 1 will now be described with reference to the flowchart of FIG. 2.

First in step S201, an image which was optically read from the image scanner 108 or the like is inputted. The input image is stored into the RAM 103 in step S202. The input image can also be displayed on the display 105.

Figure 3:
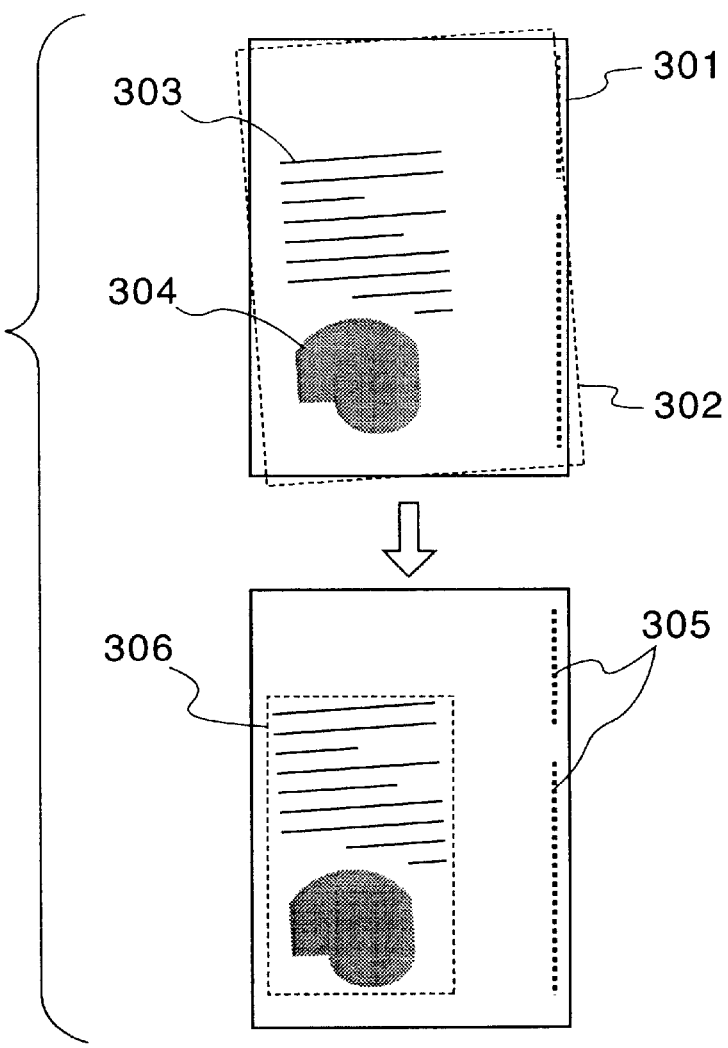
FIG. 3 is a diagram for explaining an input image according to the first embodiment.

In step S203, in order to obtain a tilt amount of a document in the input image, a check area is obtained in the input image. An example of a check area obtaining process in step S203 will now be described with reference to FIG. 3. Reference numeral 301 shown by a rectangle of a solid line denotes a rectangle showing a range of the input image. Reference numeral 302 shown by a rectangle of a broken line shows a tilt of the original. A document portion 303, a halftone portion 304, and noise 305 exists in the input image. In the image, since a necessary portion is a document portion, it exists in the slightly lower left portion of the input image. Since an unnecessary image such as noise or the like exists in the peripheral portion in many cases, a rectangle which was reduced from the periphery of the input image 301 by only a predetermined size is first presumed and a circumscribed rectangle of the image as a processing target in which such a reduced rectangle is set to the maximum size is obtained. By further obtaining a histogram from the image included in the circumscribed rectangle, an area 306 shown by the rectangle of the broken line is derived and is set to a check area.

Figure 5:
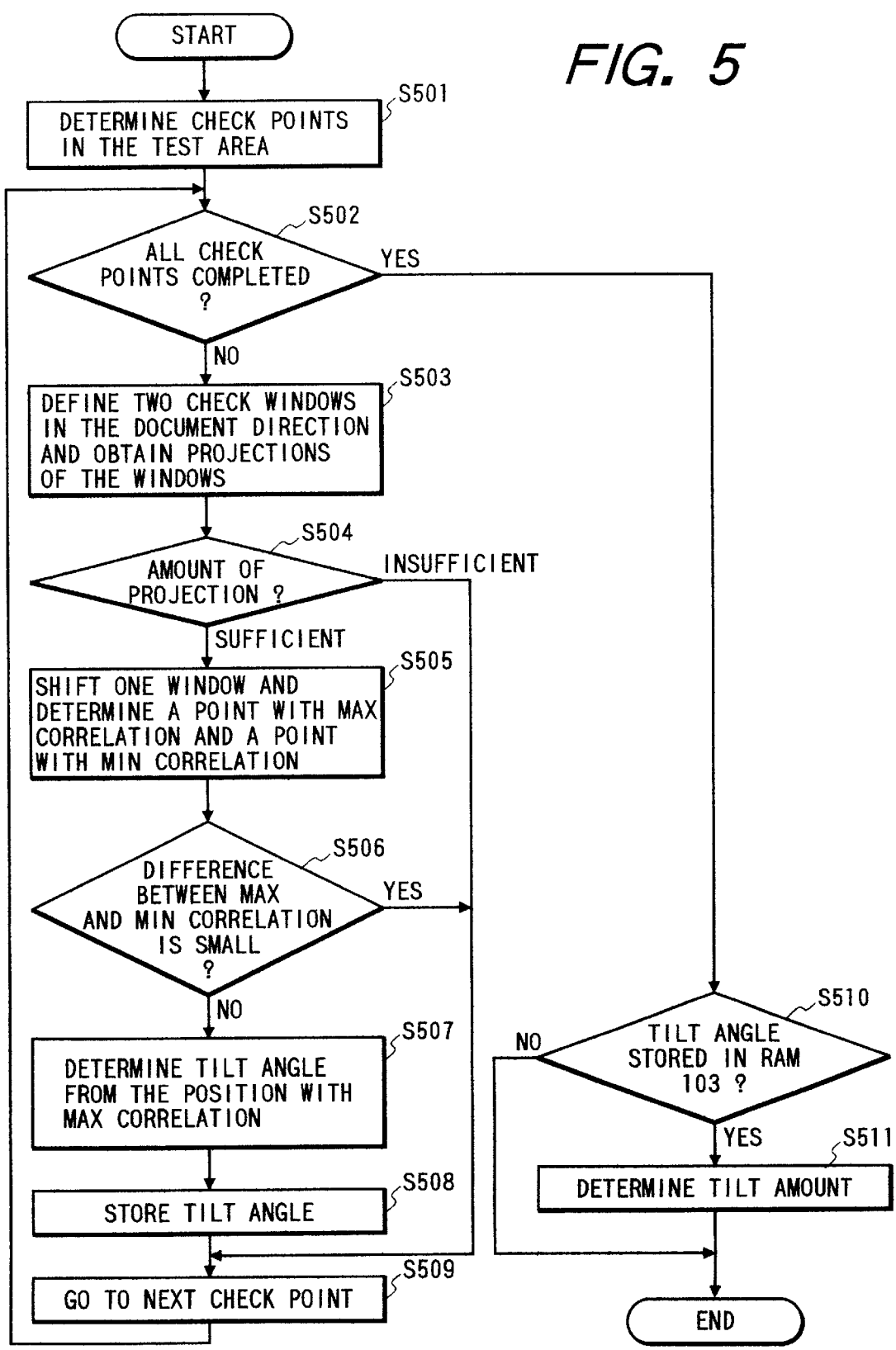
FIG. 5 is a flowchart for a process to obtain a tilt amount which is executed by the image processing apparatus according to the first embodiment.

By analyzing the image in the check area obtained, a document direction in the check area is judged (S204). The document direction is judged by a well-known method such as a method of using a tendency such that when the document image is thinned out or is subjected to a thickening process, pixels are coupled in the typesetting direction of the document, or the like. Even when a diagram, halftone, or the like mixedly exist or vertical characters and horizontal characters mixedly exist, the document direction is decided from a rough tendency. Thus, with respect to the area which was judged such that the document direction is horizontal in step S205, the processing routine advances to step S206. A tilt amount is obtained by a horizontal tilt amount detecting method. With regard to the area which was judged such that the document direction is vertical in step S205, the processing routine advances to step S207 and the tilt amount is obtained by a vertical tilt amount detecting method. The details of the tilt amount detecting processes which are executed in steps S206 and S207 will now be described hereinbelow with reference to the flowchart of FIG. 5.

Figure 6:
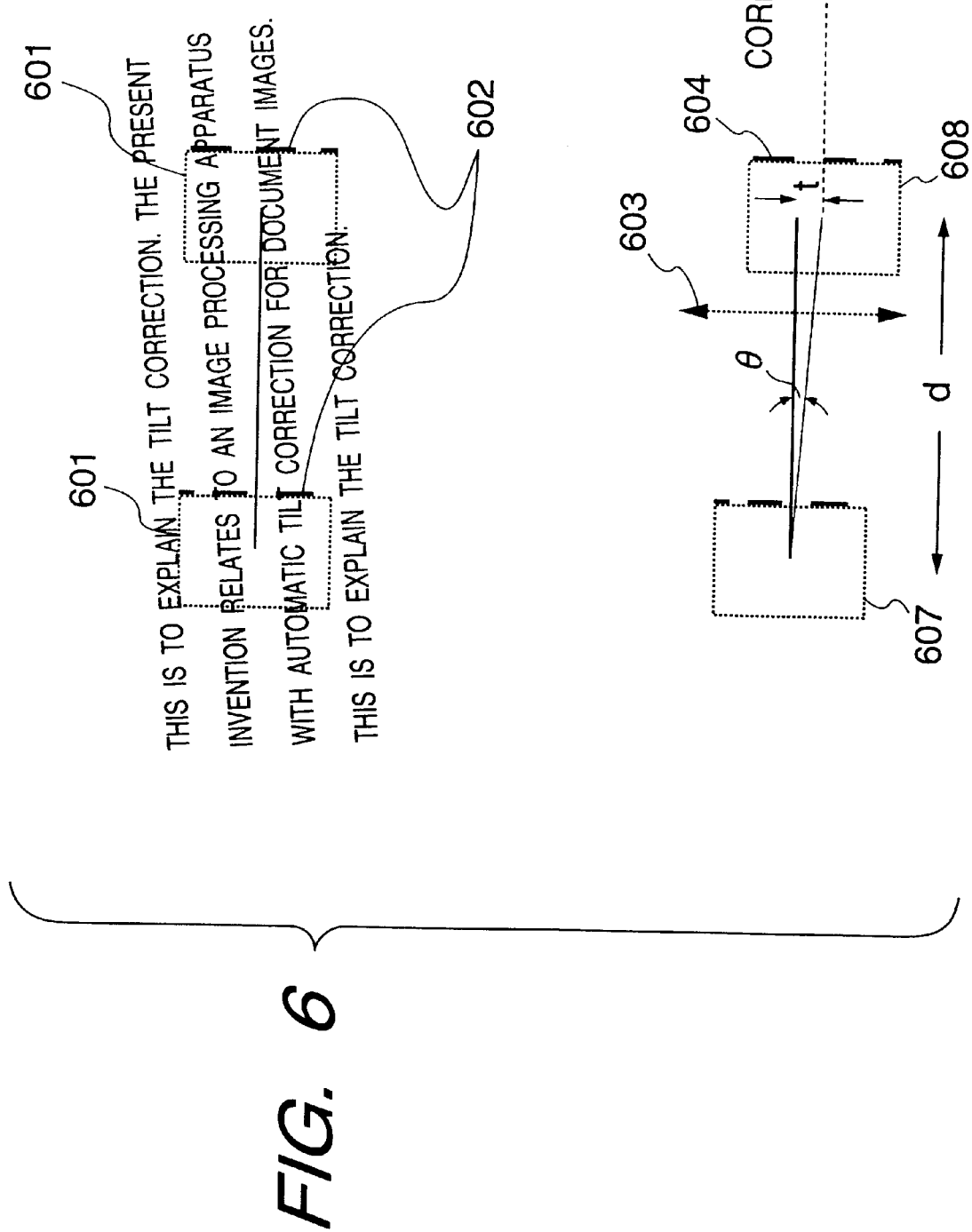
FIG. 6 is a diagram for explaining a process for obtaining a tilt amount according to the first embodiment.

First in step S501, check points to check the tilt amount are determined so as to b distributed to a plurality of locations in the check area obtained in step S203, namely, so as to be distributed to a whole check area as much as possible. The check points can be determined at regular intervals or can also be decided by using random numbers or the like. In step S502, with respect to all of the decided check points, the following checks are individually executed. In step S503, two check windows are set in parallel in a target check area along the document typesetting direction of the check area judged in step S205 and their projections are obtained. Its situation is shown in FIG. 6 in case of a horizontal document as an example. Reference numeral 601 denotes two check windows as a pair and their projections are shown at 602. In the example of FIG. 6, since the document is horizontal, the check windows are set in the horizontal direction. In case of a vertical document, the check windows are vertically set. When the projection of either one of the two check windows doesn't exist or a sufficient tilt amount is not obtained in step S504, the process at such a check point is finished and the processing routine advances to step S509. The next check points are searched.

In step S505, subsequently, while one check window is shifted in the direction normal to the document typesetting direction in a predetermined tilt amount range, a correlation of the projections of the two check windows is obtained. A point at which the correlation value is maximum and the point at which the correlation value is minimum are detected. In FIG. 6, a left check window 607 is fixed and a right check window 608 is shifted in the vertical direction normal to the horizontal direction of the document typesetting direction in a range 603. An amount of coincidence degree of a portion where projections exist in both of the check windows or no projection exists in both of the check windows is detected as a correlation. A detection value of such a correlation is shown at 605. When the right check window exists at a position 604, the correlation between the projections of the two windows is maximum. When it is judged in step S506 that a difference between the maximum and minimum values of the correlation is small, it is regarded that such a portion is not a part of the image of the line whose projection could correctly be extracted. The process of the check points is finished and the processing routine advances to step S509. The next check points are searched.

In step S507, a tilt angle of the document image of the inherent original is obtained by a shift angle of the point of the maximum correlation. In FIG. 6, the projection when the right check window is shifted downward by t shows the maximum correlation. Now, assuming that the interval of the check windows is equal to d and a tilt angle of the document image is equal to θ, it is possible to judge that the document image is tilted in the right upward direction by only the angle θ which is expressed by $\tan\theta = t/d$. In step S508, the obtained tilt angle is stored into the RAM 103 or the like.

Since the processes for one check point have been finished in this matter, in step S509, the processing routine goes to the next check point. When it is judged in step S502 that the processes for all of the check points have been finished, step S510 follows. When the tilt angle has been stored in the RAM 103, a tilt amount of the input image is determined in accordance with the tilt angle (S511). As a tilt amount that is determined in step S511, it is possible to use an average of the tilt angles stored in the RAM 103 in step S508, a center value of the distribution, or the like. When it is judged in step S510 that there is no tilt angle stored, it is judged that the tilt amount of the input original is not obtained. The tilt detecting process of the original is finished. With respect to the vertical document as well, a tilt amount can be obtained in a manner similar to the processes shown in the flowchart of FIG. 5 like a horizontal document shown in FIG. 6.

Figure 4:
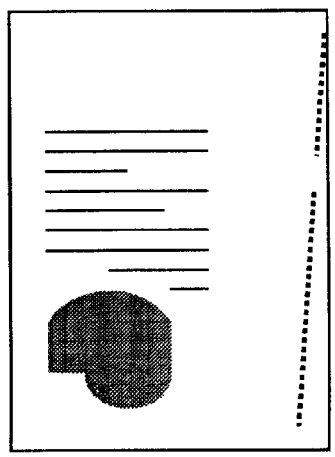
FIG. 4 is a diagram for explaining an output image according to the first embodiment.

When the tilt amounts are obtained in steps S206 and S207, the input image is deformed so as to eliminate the tilt of the original in step S208. As for the modification, it is sufficient to rotate the image by only the tilt amount obtained in step S511 around the center of gravity of the input original as a rotational center. Thus, from the input image of FIG. 3, an image in which the tilt of the document portion was eliminated is obtained as shown in FIG. 4.

As described above, according to the embodiment, by eliminating the peripheral portion of the input image from a target to obtain the check area, there is an effect of a decrease in noise included in the check area. By allowing a plurality of check points to exist in the whole check area and by using the tilt angle of a high reliability among them, there is an effect such that the tilt amount can be accurately obtained from the document area existing in a part of the input original. Further, there is an effect such that even if the check area is not a document image and the same parallel line in the same direction as the typesetting direction like a ruled line is included, the tilt angle can be correctly obtained.

Although the above embodiment has been described on the basis of the least limit number of component requirements for embodying the invention, for example, it is also possible to construct in a manner such that data such as a program for executing processes to embody the invention or the like is provided to a general computer from the outside or such data is stored in the external storage 104 and is previously stored into the RAM 103. It is also possible to construct in a manner such as to process the input images which have previously been stored in the external storage 104. The correlation of the projections is also not limited to that in the embodiment.

The image whose tilt was eliminated and corrected in step S208 is displayed by the display 105, is printed by a printer 109, or is transmitted to an external apparatus by a communication I/F 110. Or, the corrected image is used by the image processing apparatus for the subsequent processes such as registration to an electronic file in which a high quality image is obtained because the preservation is an object, a character recognizing process in which a high quality image is obtained in order to obtain a high recognition ratio, and the like.

Figure 7:
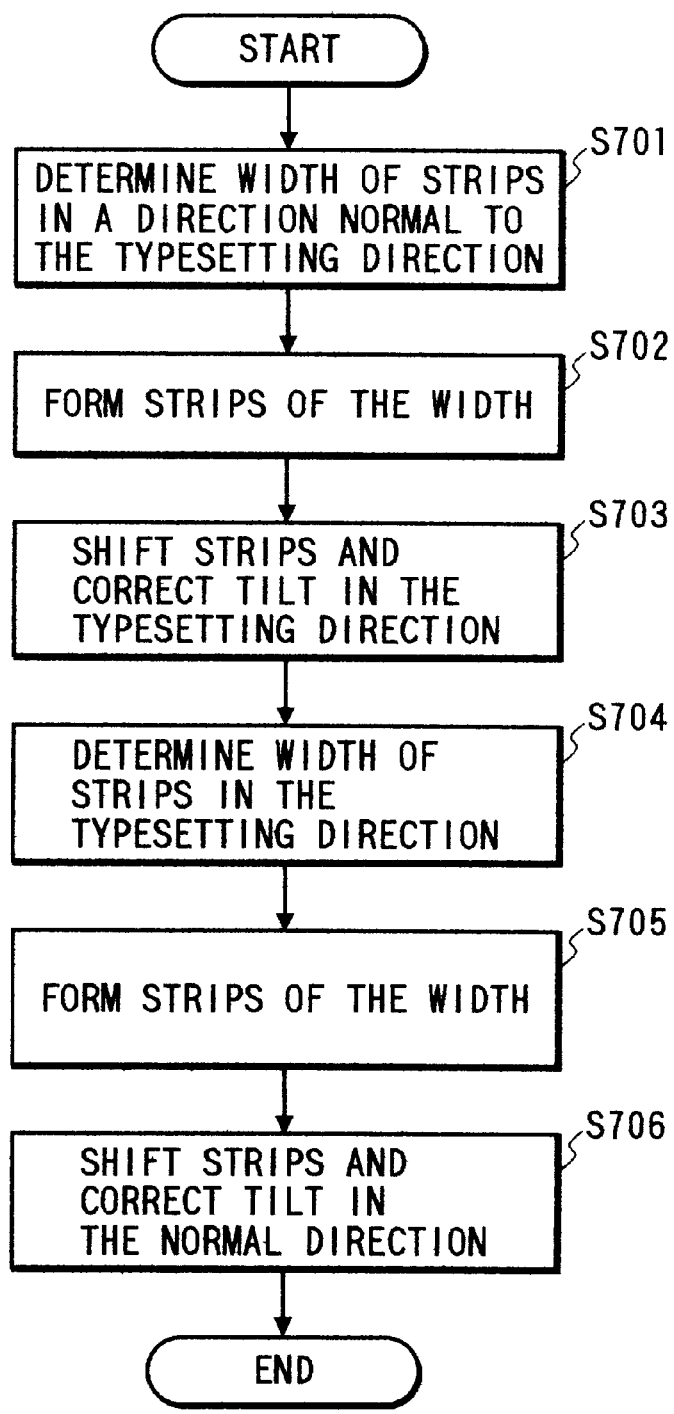
FIG. 7 is a flowchart for a process to eliminate a tilt of an image which is executed by an image processing apparatus according to the second embodiment.

An example of a process to eliminate the tilt of the image in step S208 in the embodiment will now be described with reference to the flowchart of FIG. 7.

Figure 8A:
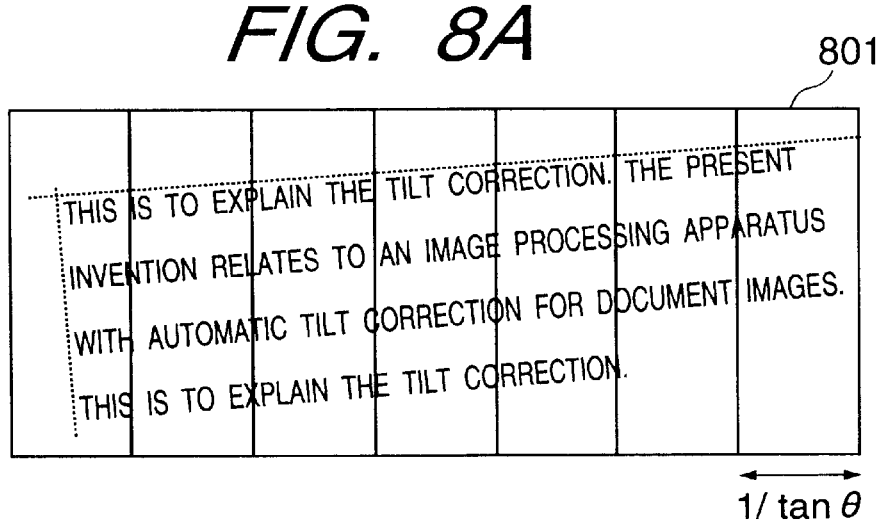
FIGS. 8A, 8B, and 8C are diagrams for explaining a process to eliminate the tilt according to the second embodiment.

In step S701, the input image is cut in the direction normal to the typesetting direction and a width to obtain a strip (shown at 801 in FIG. 8A) is determined. It is sufficient to set the width to $1/\tan\theta$ pixels. By using the width determined in step S701, a plurality of strips are formed in the direction normal to the typesetting direction at regular intervals as shown in FIG. 8A (S702). In this instance, the strips are symmetrically formed with respect to the center of gravity of the input image.

Figure 8B:
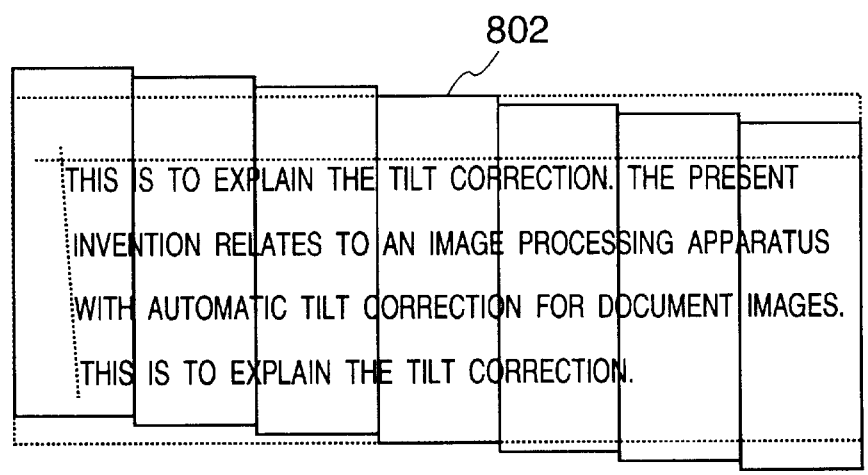

In step S703, a strip 802 including the center of gravity of the input image is used as a reference and as shown in FIG. 8B, the strips around the strip 802 are shifted one pixel by one so as to be aligned in the tilt direction, thereby eliminating and correcting the tilt in the typesetting direction.

Figure 8C:
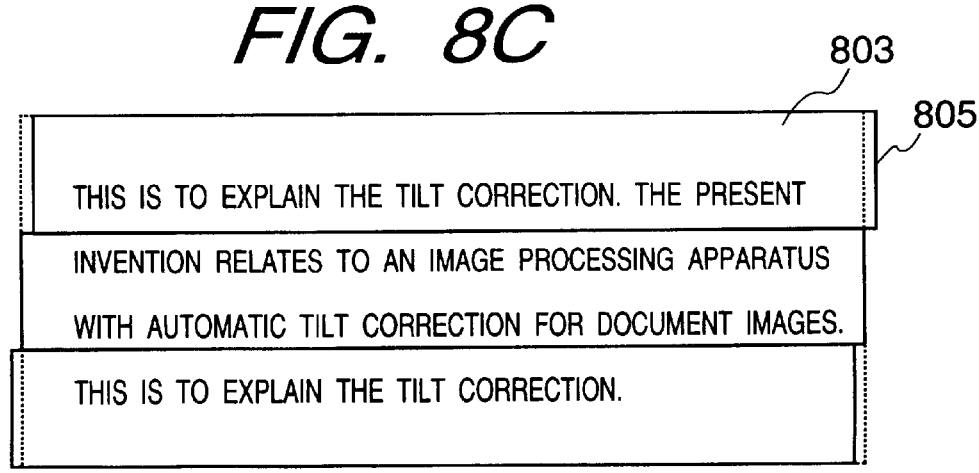

Similarly, a width of strip extending in the typesetting direction is obtained in step S704. A strip in the typesetting direction (805 in FIG. 8C) is formed in step S705. Those strips are shifted one pixel by one so as to be aligned to the tilt direction, thereby eliminating the correcting of the tilts in the direction normal to the typesetting direction and the vertical direction. The width of strip can be set to $1/\tan\theta$ pixels. By the above processes, an image 803 whose tilt was corrected can be obtained.

As described above, according to the embodiment, by shifting the strip of the width obtained by the tilt amount, there is an effect such that the tilt of the image can be eliminated and corrected at a high speed.

What is claimed is:

1. An image processing method comprising the steps of:
   defining two partial image areas in an input image such that the partial image areas are spaced apart in the horizontal direction by an interval (d);
   detecting a shift amount (t) of one of the partial image areas when a correlation of respective horizontal projections of the two partial image areas is maximum by vertically shifting the one of the partial image areas, the correlation indicating an amount of coincidence degree of the respective horizontal projections of the two partial image areas; and
   obtaining a tilt angle ($\theta$) of said input image in accordance with the shift amount (t) and the interval (d).

2. A method according to claim 1, further comprising the step of correcting the tilt of said input image in accordance with said obtained tilt angle.

3. A method according to claim 1, wherein said defining step includes defining partial image areas at a respective plurality of locations in the input image, and said detecting step includes detecting the shift amount for each pair of the defined partial image areas, and said obtaining step includes obtaining the tilt angle for each pair of the defined partial image areas.

4. A method according to claim 3, further comprising the step of determining tilt amount in accordance with the obtained tilt angles.

5. A method according to claim 1, wherein an extent of the vertically shifting of the one of the partial image areas is set within a predetermined range.

6. A method according to claim 1, further comprising the steps of:
   judging whether an amount of projection of at least one of the partial image areas is sufficient; and
   interrupting the detecting step and the obtaining step if the projection amount is judged not to be sufficient.

7. A method according to claim 1, wherein a maximum value and a minimum value of the correlation of said projections are obtained and when a difference between the maximum and minimum values is determined to be small, the obtaining step is interrupted.

8. A method according to claim 2, wherein said corrected image is displayed on a display means.

9. A method according to claim 2, wherein said corrected image is printed by printing means.

10. A method according to claim 2, wherein said corrected image is registered into an electronic file.

11. A method according to claim 2, further comprising the step of character recognizing the corrected image.

12. An image processing method comprising the steps of:
   defining two partial image areas in an input image such that the partial image areas are spaced apart in the horizontal direction by an interval (d);
   detecting a shift amount (t) of one of the partial image areas when a correlation of respective horizontal projections of the two partial image areas is maximum by vertically shifting the one of the partial image areas;

obtaining a tilt angle (θ) of said input image in accordance with the shift amount (t) and the interval (d); and correcting the tilt of said input image in accordance with said obtained tilt angle, wherein said correcting step further comprises:
- deciding a division width (1/tan θ) of the input image in accordance with said detected tilt angle;
- dividing the input image into a plurality of small areas having said decided division width; and
- forming the corrected image by recombining the portion of the image data such that the small areas are shifted in the vertical direction.

13. A method according to claim 12, wherein the step of dividing said image into said small areas comprises dividing the image in each of the horizontal and vertical directions, and wherein in the forming step, the shifting of the divided small areas is executed in both of the horizontal and vertical directions.

14. A method according to claim 1, wherein said input image is inputted by scanning an original image by scanner.

15. An image processing apparatus comprising:
- defining means for defining two partial image areas in an input image such that the partial image areas are spaced apart in the horizontal direction by an interval (d);
- detecting means for detecting a shift amount (t) of one of the partial image areas when a correlation of respective horizontal projections of the two partial image areas is maximum by vertically shifting the one of the partial image areas, the correlation indicating an amount of coincidence degree of the respective horizontal projections of the two partial image areas; and
- obtaining means for obtaining a tilt angle (θ) of said input image in accordance with the shift amount (t) and the interval (d).

16. The apparatus according to claim 15, further comprising correcting means for correcting the tilt of said input image in accordance with said obtained tilt angle.

17. The apparatus according to claim 15 wherein said defining means defines partial image areas at a respective plurality of locations in the input image, and said detecting means detects the shift amount for each pair of the defined partial image areas, and said obtaining means obtains the tilt angle for each pair of the defined partial image areas.

18. The apparatus according to claim 17, further comprising determining means for determining tilt amount in accordance with the obtained tilt angles.

19. The apparatus according to claim 15, wherein an extent of the vertically shifting of the one of the partial image areas is set within a predetermined range.

20. The apparatus according to claim 15, further comprising:
- judging means for judging whether an amount of projection of at least one the partial image areas is sufficient; and
- interrupting the detecting means and the obtaining means if the projection amount is judged not to be sufficient.

21. The apparatus according to claim 15, wherein a maximum value and a minimum value of the correlation of said projections are obtained and when a difference between the maximum and minimum values is determined to be small, the obtaining means is interrupted.

22. The apparatus according to claim 16, wherein said corrected image is displayed on a display means.

23. The apparatus according to claim 16, wherein said corrected image is printed by printing means.

24. The apparatus according to claim 16, wherein said corrected image is registered into an electronic file.

25. The apparatus according to claim 16, further comprising character recognizing means for character recognizing the corrected image.

26. An image processing apparatus, comprising:
- defining means for defining two partial image areas in an input image such that the partial image areas are spaced apart in the horizontal direction by an interval (d);
- detecting means for detecting a shift amount (t) of one of the partial image areas when a correlation of respective horizontal projections of the two partial image areas is maximum by vertically shifting the one of the partial image areas;
- obtaining means for obtaining a tilt angle (θ) of said input image in accordance with the shift amount (t) and the interval (d); and
- correcting means for correcting the tilt of said input image in accordance with said obtained tilt angle, wherein said correcting means further comprises:
- deciding means for deciding a division width (1/tan θ) of the input image in accordance with said detected tilt angle;
- dividing means for dividing the input image into a plurality of small areas having said decided division width; and
- forming means for forming the corrected image by recombining the portion of the image data such that the small areas are shifted in the vertical direction.

27. The apparatus according to claim 26, wherein the dividing means divides said image into said small areas comprises dividing the image in each of the horizontal and vertical directions, and wherein in the forming step, the shifting of the divided small areas is executed in both of the horizontal and vertical directions.

28. The apparatus according to claim 15, wherein said input image is inputted by scanning an original image by scanner.

29. A computer readable medium having recorded thereon codes for implementing a computer implementable method of image processing comprising the steps of:
- defining two partial image areas in an input image such that the partial image areas are spaced apart in the horizontal direction by an interval (d);
- detecting a shift amount (t) of one of the partial image areas when a correlation of respective horizontal projections of the two partial image areas is maximum by vertically shifting the one of the partial image areas, the correlation indicating an amount of coincidence degree of the respective horizontal projections of the two partial image areas; and
- obtaining a tilt angle (θ) of said input image in accordance with the shift amount (t) and the interval (d).

* * * * *

UNITED STATES PATENT AND TRADEMARK OFFICE
CERTIFICATE OF CORRECTION

PATENT NO.    : 6,493,470 B1
DATED         : December 10, 2002
INVENTOR(S)   : Hiroaki Ikeda et al.

It is certified that error appears in the above-identified patent and that said Letters Patent is hereby corrected as shown below:

Column 3,
Line 67, "b" should read -- be --.

Column 7,
Line 54, "on the" should read -- one of the --;
Line 64, "he" should read -- the --.

Column 8,
Line 39, "comprises" should read -- comprising --.

Signed and Sealed this

Sixteenth Day of September, 2003

JAMES E. ROGAN
*Director of the United States Patent and Trademark Office*